United States Patent
WenLong et al.

(10) Patent No.: US 8,003,899 B2
(45) Date of Patent: Aug. 23, 2011

(54) MOUNTING FOR INDUSTRIAL INSTRUMENTATION

(75) Inventors: Chen WenLong, Chang Zhou (CN); James F. Million, Columbus, OH (US); John Moorman, Powell, OH (US); Douglas P. Bliss, Worthington, OH (US)

(73) Assignee: Mettler-Toledo, Inc., Columbus, OH (US)

( * ) Notice: Subject to any disclaimer, the term of this patent is extended or adjusted under 35 U.S.C. 154(b) by 262 days.

(21) Appl. No.: 12/277,355

(22) Filed: Nov. 25, 2008

(65) Prior Publication Data

US 2010/0128448 A1    May 27, 2010

(51) Int. Cl.
    *H01R 13/502* (2006.01)
(52) U.S. Cl. .......................... 174/561; 361/736; 361/752
(58) Field of Classification Search .................. 174/520, 174/561; 361/659, 664, 736, 752
    See application file for complete search history.

(56) References Cited

U.S. PATENT DOCUMENTS

| | | | |
|---|---|---|---|
| 5,455,744 A | 10/1995 | Watanabe | |
| 5,602,363 A | 2/1997 | Von Arx | |
| 6,535,409 B2 | 3/2003 | Karol | |
| 6,563,710 B1 | 5/2003 | Okuda et al. | |
| 6,678,181 B2 | 1/2004 | Karol et al. | |
| 7,265,966 B2 * | 9/2007 | Dudley | 361/659 |
| 7,378,590 B1 | 5/2008 | Herth | |
| 2006/0243472 A1 | 11/2006 | Ku et al. | |

FOREIGN PATENT DOCUMENTS

| | | |
|---|---|---|
| DE | 1690161 B1 | 11/1971 |
| DE | 19709554 C1 | 6/1998 |

OTHER PUBLICATIONS

Hardy Intsruments, Hardy HI 4050 User's Guide, Chapter 1 Overview and Chapter 3 Installation, 15 pages, Hardy Instruments, Inc., San Diego, CA, 2006.

* cited by examiner

*Primary Examiner* — Hung V Ngo
(74) *Attorney, Agent, or Firm* — Standley Law Group LLP

(57) ABSTRACT

A flexible, modular mounting system for an industrial process terminal or similar instrumentation. The instrumentation may be panel mounted or DIN rail mounted using an enclosure having only a minimum number of unique components. An instrument housing is included for containing various electronic components of such a terminal. The housing is adapted to mate with a DIN rail, and can easily be fitted with mounting brackets that allow the housing to be used in a panel mounted arrangement. In the latter case, a user interface module is located on an opposite side of a panel wall and connected to the appropriate electronic components of the instrumentation through an opening provided therein.

31 Claims, 3 Drawing Sheets

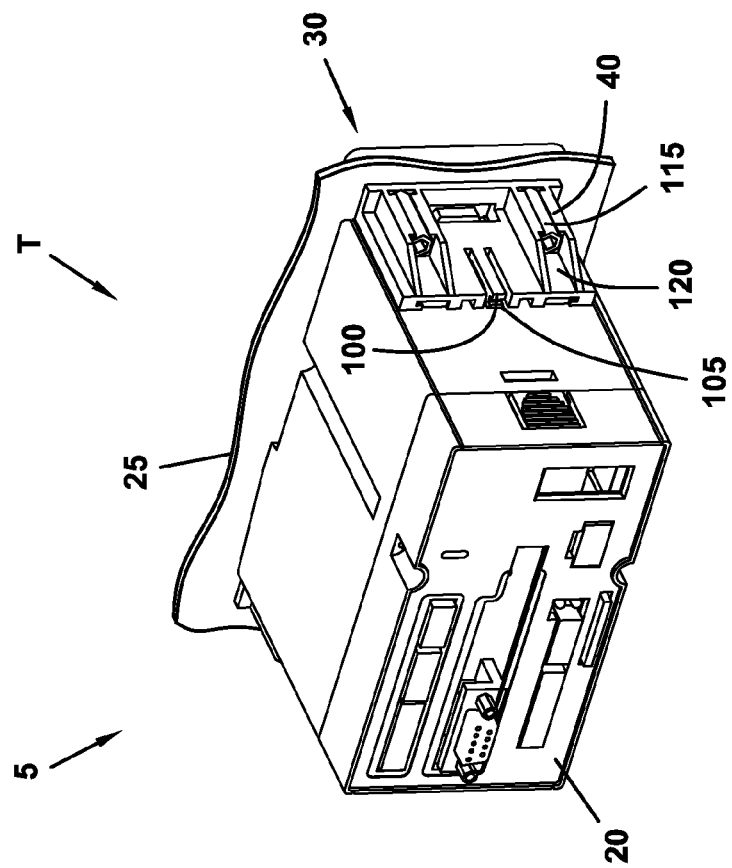
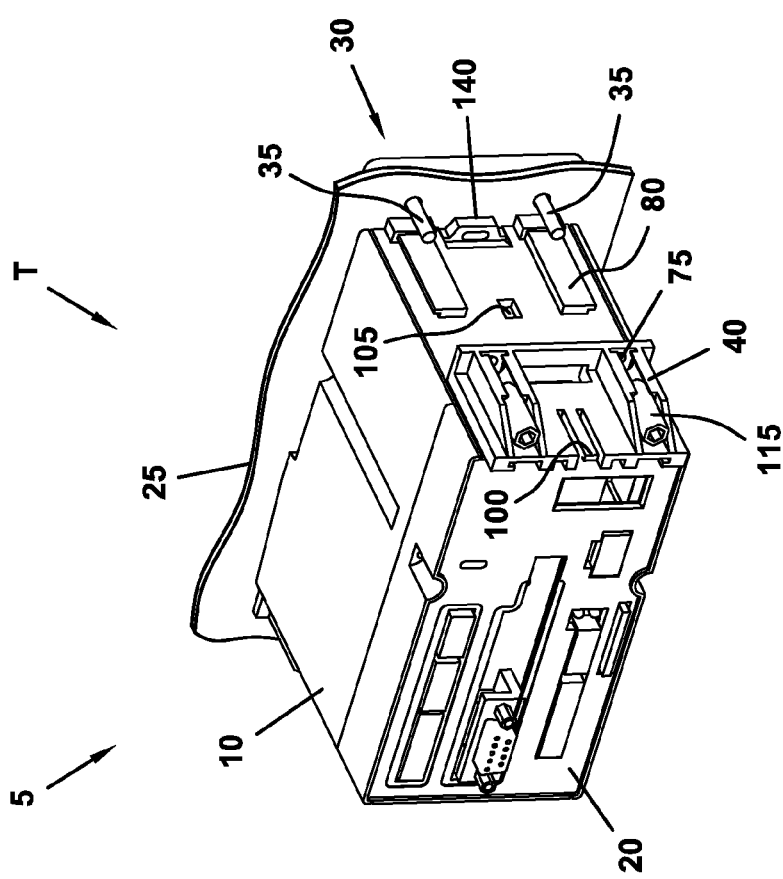

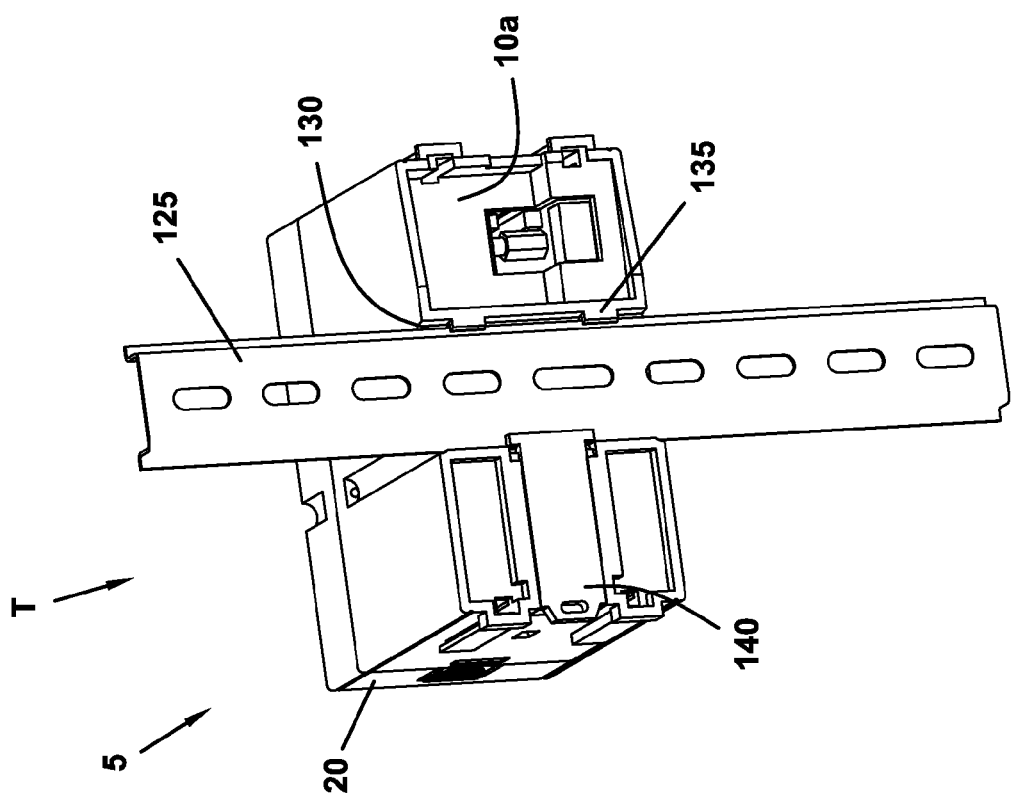
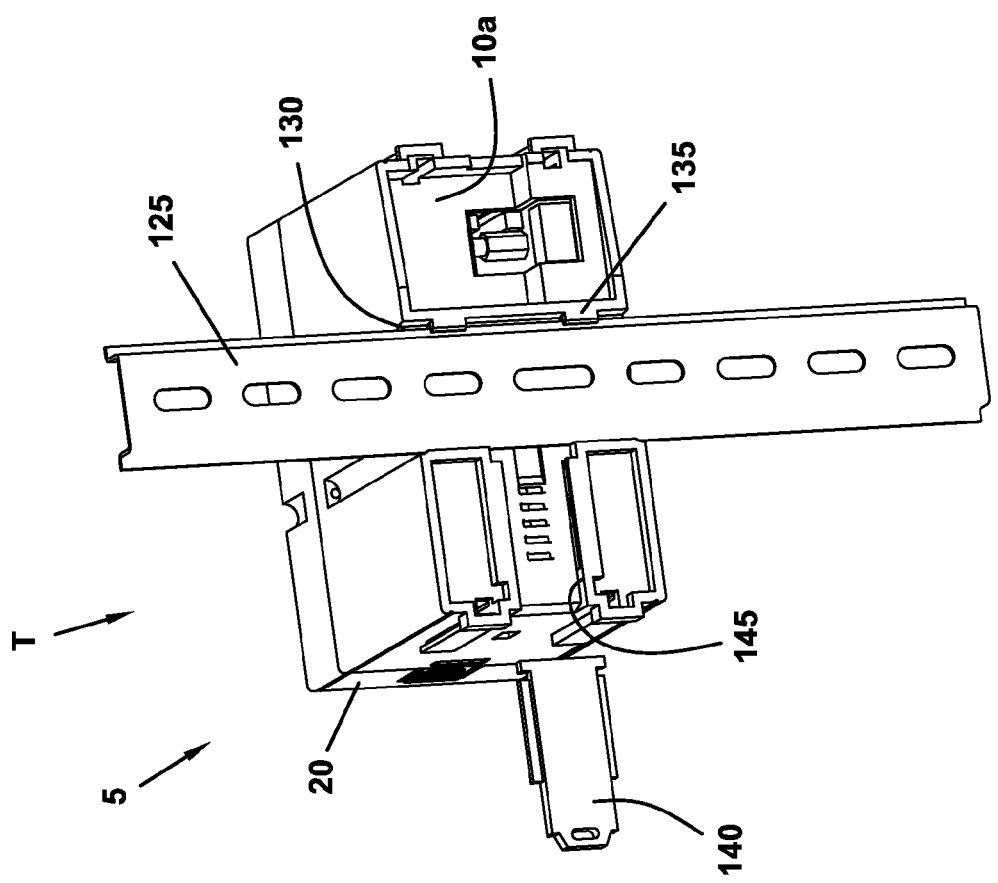
FIG. 3a
FIG. 3b

MOUNTING FOR INDUSTRIAL INSTRUMENTATION

BACKGROUND

The present invention is directed to an industrial process terminal and to the mounting thereof. More particularly, the present invention is directed to an industrial process terminal mounting system having an electronics housing that allows the industrial process terminal to be either panel mounted or DIN rail mounted.

Industrial process control equipment such as, for example, industrial weighing scales, often include a process terminal (terminal) that may be mounted in a control panel or similar housing. Such a process terminal may include various electronic components and a user interface. When a user interface is present, it may be accessible from outside of the control panel or may reside wholly within the control panel enclosure. Alternatively, terminals and other similar instrumentation may have minimal or no user interface.

Terminals are typically adapted for either panel mounting or DIN rail mounting. For example, terminals having no user interface or only a minimal user interface are frequently mounted on a DIN rail located within a control panel enclosure. Alternatively, terminals having a more substantial or more frequently accessed user interface may be panel mounted, wherein a majority of the terminal electronics reside within the control panel enclosure while a user interface is accessible from the outside thereof. Unfortunately, terminals have been hitherto designed for one mounting method or the other. Consequently, such terminals have required different and dedicated mounting hardware, which limits terminal mounting interchangeability and increases product costs. In contrast, the present invention allows a terminal to be panel mounted or DIN rail mounted, with the addition of only minor and inexpensive mounting components.

SUMMARY OF THE GENERAL INVENTIVE CONCEPT

The present invention includes an instrument enclosure for housing various electronic components of a terminal or other industrial instrumentation. The instrument enclosure may be a wholly or partially molded article so as to facilitate manufacturing simplicity and cost effectiveness. The instrument enclosure is modular in nature, in that it is adapted to allow for either panel or DIN rail mounting. DIN rail mounting may be accomplished via a DIN rail mounting slot that is molded into or otherwise associated with a rear face of an enclosure housing.

The same instrument enclosure may also be panel mounted by the addition of a pair of mounting brackets to the housing. When panel mounted, the instrument enclosure housing cooperates with a user interface module to secure the associated terminal or other instrumentation to a (control) panel wall. The mounting brackets and housing are modular in nature, in that the housing and mounting brackets have cooperating structures that allow the attachment of one to the other. In one exemplary embodiment, the housing includes raised, dovetailed ribs that mate with corresponding slots in the mounting brackets. A molded snap (locking element) may be used to secure the mounting brackets, and a molded stop may be provided to properly position the mounting brackets on the housing. The housing/mounting bracket assembly is then placed against an interior of a control panel wall, with the user interface module aligned therewith and on the opposite side of the control panel wall. The user interface module may be secured to the housing using threaded studs that pass through holes placed in the control enclosure. The studs also pass through holes in the mounting brackets and engage associated nuts such that the instrument enclosure and the user interface module are secured to the control panel wall.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 2a is an enlarged view of the enclosure of FIG. 1 in a partially panel mounted state;

FIG. 2b is an enlarged view of the enclosure of FIG. 1 in a fully panel mounted state;

FIG. 3a is an enlarged view of the enclosure of FIG. 1 in a partially DIN rail mounted state; and FIG. 3b is an enlarged view of the enclosure of FIG. 1 in a fully DIN rail mounted state.

DETAILED DESCRIPTION OF THE EXEMPLARY EMBODIMENT(S)

Figure 1:
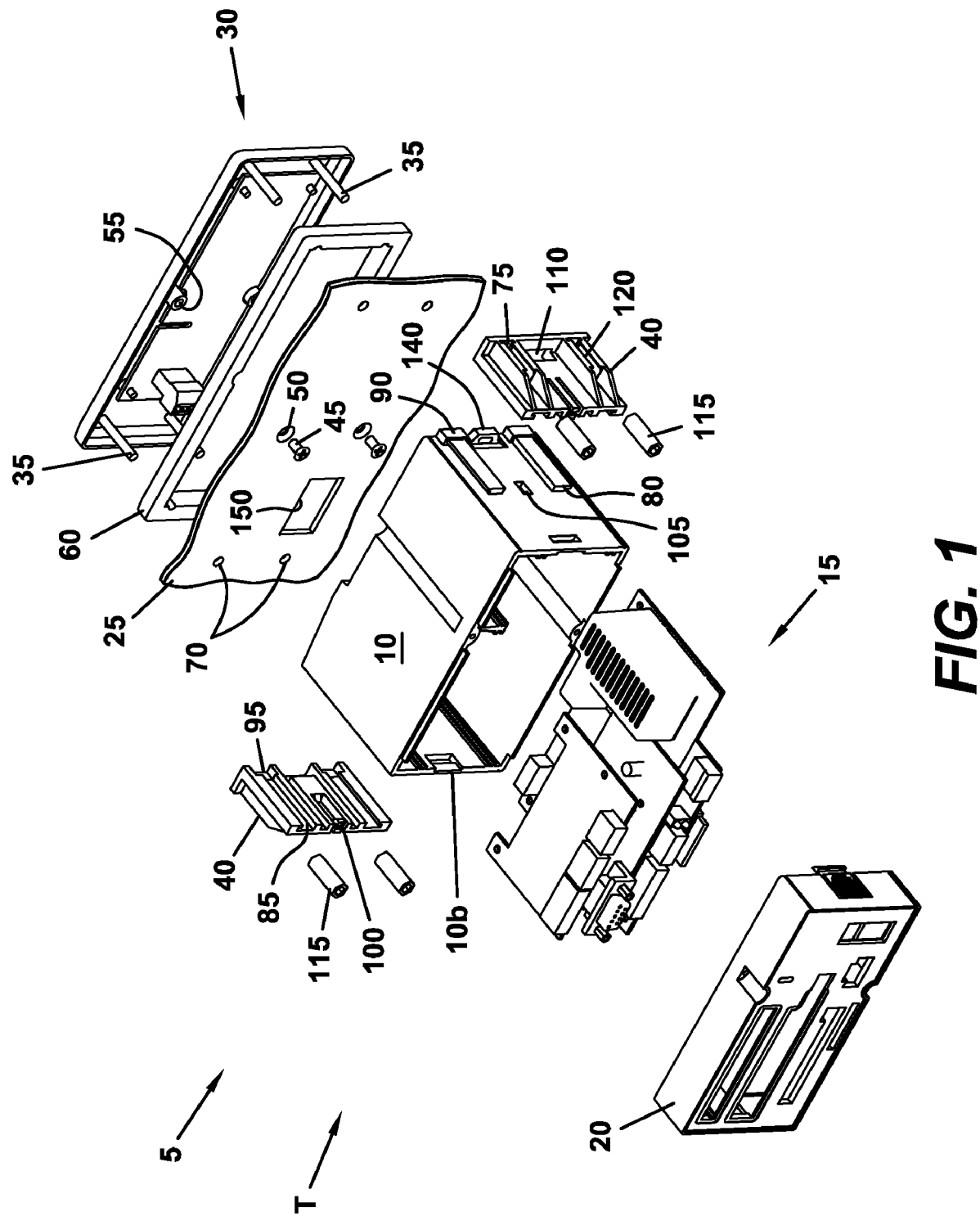
FIG. 1 is an exploded perspective view of one exemplary embodiment of an instrument enclosure of the present invention, the enclosure capable of being both panel and DIN rail mounted.

As discussed above, process terminals and other industrial instrumentation are normally designed for panel mounting or DIN rail mounting, but not both. That is, a user typically must select the mounting style of such industrial instrumentation upon ordering and, if it is subsequently desired to employ the alternative mounting technique, very little if any of the already possessed instrumentation is typically useable.

As can be easily inferred from the aforementioned situation, existing industrial instrumentation makes use of very limited, if any, common mounting components. As such, it is necessary to produce unique mounting components for each of a panel mounted and DIN rail mounted version of the same industrial instrumentation. In addition to the undesirable costs associated with producing such unique components, current designs dictate that a particular terminal or other industrial instrument cannot be easily converted from one mounting style to the other.

An exemplary mounting enclosure 5 of the present invention is illustrated in FIG. 1, and is shown in this example to form a portion of a industrial weighing scale process terminal T. The industrial weighing scale process terminal (which may also be referred to herein as "process terminal" or "terminal") T is depicted for purposes of illustration only, and it is to be understood that other types of panel mounted and/or DIN rail mounted industrial instrumentation may be flexibly mounted using an enclosure 5 of the present invention. More particularly, the present invention allows a terminal or similar instrument to be selectably panel mounted or DIN rail mounted while using a majority of the same mounting components.

The exploded view of FIG. 1 depicts the various components of the enclosure 5 when configured for panel mounting. As shown, the enclosure 5 includes a substantially hollow instrument housing 10 that is adapted to contain various terminal electronics (e.g., PC boards) 15. A cover 20 attaches to a corresponding open face 10b of the instrument housing 10 while providing cable access to various connectors, etc., of the terminal electronics 15. When configured for panel mounting, as shown, the cover 20 may be considered a rear cover, which attaches to a rear face of the housing 10.

The housing 10 is designed to abut a rear face of a panel wall (e.g., a control panel wall) 25 when panel mounted. Only a portion of an exemplary panel wall 25 is shown for reasons of clarity. When panel mounted, the enclosure 5 also includes a user interface module 30 that may contain one or more displays, input devices, etc., and is appropriately designed to connect with the electronics of the particular industrial instrumentation contained therein. As is described in more detail below, the user interface module is aligned with the housing 10 and abuts the opposite side of the panel wall 25 when in proper mounting position. Threaded studs 35 are attached to the user interface module 30 and pass through the panel wall 25 and a pair of mounting brackets 40 that are affixed to the housing 10. The enclosure 5 is thereby secured to the panel wall 25 with the user interface module 30 exposed along the panel exterior for easy viewing and/or interaction by a user.

The user interface module is connected to the appropriate electronic components located in the instrument enclosure 10 through an opening 150 provided through the panel wall 25. Additionally, the user interface module 30 may be affixed to the front face of the panel wall 25 using two screws 45. The screws 45 pass through openings 50 that have been appropriately created in the panel wall 25 and thread into receiving holes 55 in the interface module 30. In this particular embodiment, an optional gasket 60 also resides between the interface module 30 and the panel wall 25 for sealing purposes.

A better understanding of the panel mounting technique referred to briefly above can be gained by further reference to FIGS. 1-2b. As shown in FIG. 2a, the terminal electronics 15 and rear cover 20 have been installed to the housing 10. Attachment of the housing 10 to the rear face of the panel wall 25 includes attaching the mounting brackets 40 to the housing, and passing the threaded studs 35 of the user interface module 30 through openings 70 that have been appropriately created in the panel wall 25 and through fastener receiving apertures 75 in the mounting brackets. The steps of attaching the mounting brackets 40 to the housing 10 and installing the threaded studs 35 may occur in any order. For example, while for the sake of clarity FIG. 2a depicts the threaded studs 35 as extending through the housing 10 and panel wall 25 prior to installation of the mounting brackets 40, it is possible (and probable) that the mounting brackets would be attached to the housing prior to installation of the user interface module 30.

As can be seen in FIGS. 1-2b, each mounting bracket 40 is secured to the housing 10 via the engagement of raised mounting ribs 80 on the housing with corresponding mounting grooves 85 in the mounting bracket 40. As shown in this particular embodiment, the raised mounting ribs 80 and corresponding mounting grooves 85 have an interlocking configuration that facilitates assembly of a mounting bracket to the housing while simultaneously acting to prevent any unintended non-sliding disassembly thereof. As would be understood by one skilled in the art, other interlocking mounting rib/receiving groove configurations may also be employed, and nothing herein is to be interpreted as limiting the present invention to the interlocking configuration shown.

In the exemplary embodiment shown, the raised mounting ribs 80 terminate in stop blocks 90 that set the proper position of the mounting brackets 40 on the housing 10. The stop blocks 90 fit into corresponding receptacle portions 95 of the mounting bracket mounting grooves 85. Each mounting bracket 40 also preferably includes an extending locking leg 100 that engages a corresponding slot 105 in the housing 10 to prevent sliding of the mounting brackets along the mounting ribs 80. The mounting brackets 40 may also include a cavity 110 that permits the mounting brackets to clear a DIN rail lock element 140 (described in more detail below) when the DIN rail lock element is present on a panel mounted terminal 5.

Once the threaded studs 35 are passed through the receiving apertures 75 in the mounting brackets 40, they are engaged by like-threaded nuts 115. Nut receiving cavities 120 are provided to receive the nuts 115. The nut receiving cavities 120 are preferably dimensioned so as to allow rotation of the nuts 115 therein. The nuts 115 may be of hexagonal cross-section as shown, but it would be apparent to one skilled in the art that other cross-sections may also be employed. Further, the nuts 115 may be imparted with a groove, socket or other feature that facilitates the rotation thereof.

With the nuts 115 in the nut-receiving cavities 120 and the threaded studs 35 engaged therewith, the nuts 115 are rotated in a threading direction. This threading of the nuts 115 onto the threaded studs 35 draws the enclosure 5 toward the user interface module 30 and into a secure, retained position against the rear face of the panel wall 25. Necessary electrical (e.g., communications) connections may then be made between the industrial instrumentation and associated equipment (a weighing scale in this particular example).

An alternative, DIN rail mounting of the enclosure 5 is illustrated in FIGS. 3a-3b. As shown, the enclosure 5 again includes the housing 10 containing the various terminal electronics 15. The cover 20 is also again attached to the housing 10, but to what is, in the case of a DIN rail mounting, the front face thereof. That is, when the enclosure 5 is DIN rail mounted within a cabinet, what was the rear cover 20 with respect to the previously described panel mounted enclosure becomes the front cover plate of the DIN rail mounted enclosure. Preferably, but not essentially, the front cover 20 allows for the inclusion of a small display (not shown) that is visible and accessible to a user when a terminal T or similar instrumentation is DIN rail mounted. The face of the housing 10 that abuts the panel wall 25 in the panel mounted embodiment of FIGS. 1-2b, becomes the face that engages a DIN rail 125 in this embodiment. While the DIN rail 125 is shown to have a vertical orientation in this particular example, the housing 10 may also be attached to a DIN rail 125 of horizontal or other orientation.

As can be seen in FIGS. 3a-3b, the engaging face 10a of the housing 10 includes a DIN rail receiving groove 130 that is adapted to receive the DIN rail 125 therein. In this embodiment, the housing 10 also includes integrally molded lock tabs 135 that act to retain one side of the DIN rail 125 once the DIN rail is placed in the DIN rail receiving groove 130. The opposite side of the DIN rail 125 is secured to the housing 10 by means of a sliding DIN rail lock element 140 that resides in a corresponding slot 145 in the instrument enclosure. The DIN rail lock element 140 is shown removed from the slot 145 in FIG. 3a to permit a better view of this construction. As can be understood by reference to the drawing figures, the DIN rail lock element 140 resides in a retracted position prior to placement of the DIN rail 125 into the DIN rail receiving groove 130, whereafter it is moved to a locked position, as shown in FIG. 3b.

As should be clear from a review of the drawing figures and above description, the design of the housing 10 is such that it facilitates easy panel or DIN rail mounting of an associated instrument. For example, to switch from a DIN rail mounting arrangement to a panel mounting arrangement, only the addition of the mounting brackets is required. And, installation of the mounting brackets may be quickly and easily achieved due to the use of the interlocking configuration that serves to connect the two components. It is also possible to mold in or otherwise permanently attach the mounting brackets to the instrument enclosure. However, it should be apparent that a cost savings may be achieved by maintaining the mounting brackets as separate components that may be omitted when a customer is only interested in DIN rail mounting an associated instrument. In this regard, omission of the mounting brackets from a DIN rail mounting installation also frees up space that can instead be occupied by nearby wiring trays or other equipment. Further, due to the commonality of components, mounting brackets could be subsequently and inexpensively purchased by the customer should it become desired or necessary to switch from a DIN rail mounted arrangement to a panel mounted arrangement.

It can be understood from the drawing figures and associated written description regarding certain exemplary embodiments of the present invention, that such an instrument enclosure allows for flexible mounting of industrial instrumentation while minimizing the number of unique parts associated with each mounting technique. It would also be apparent to one skilled in the art that the present invention would encompass variations of the exemplary embodiments shown and described herein. Therefore, while certain embodiments of the present invention have been described in detail above, the scope of the invention is not to be considered limited by such disclosure, and modifications are possible without departing from the spirit of the invention as evidenced by the following claims:

What is claimed is:

1. An instrument enclosure comprising:
    a substantially hollow housing for containing various electronic components of said instrument;
    a cover plate for attachment to a first, open face, of said housing;
    a DIN rail receiving groove passing through a second face of said housing that is opposite to said first face;
    at least one raised mounting rib located on the exterior of at least two opposing walls of said housing;
    at least two mounting brackets for panel mounting said enclosure, each mounting bracket adapted to engage and be retained by a corresponding one of said raised mounting ribs on said housing, each mounting bracket including at least one hole for receiving a threaded stud of a user interface module;
    a user interface module having a plurality of threaded studs extending therefrom; and
    a plurality of like-threaded nuts for engaging said threaded studs;
    wherein, said enclosure is adapted to be panel mounted by placing said second face of said housing into abutting contact with a first side of a panel wall, placing said user interface module into abutting contact with an opposite side of said panel wall, affixing said mounting brackets to said housing, passing said threaded studs of said user interface module through holes in said panel wall and through said holes in said mounting brackets, and threading said nuts onto said studs so as to draw said housing toward said user interface module and into a secure, retained position against said panel wall.

2. The instrument enclosure of claim 1, wherein said enclosure is adapted to be mounted to a DIN rail by using said DIN rail receiving groove and one or more integral lock tabs that cooperate with a sliding DIN rail lock element.

3. The instrument enclosure of claim 1, wherein said cover contains at least one opening to allow access to said electronic components of said instrument.

4. The instrument enclosure of claim 1, wherein said mounting ribs are integral to said housing.

5. The instrument enclosure of claim 1, wherein said mounting ribs are of interlocking design.

6. The instrument enclosure of claim 1, further comprising a display associated with said cover, said display viewable by a user when said enclosure is mounted to a DIN rail.

7. The instrument enclosure of claim 1, wherein said mounting brackets include nut receiving cavities.

8. The instrument enclosure of claim 1, wherein said mounting ribs each include a stop block located near said second side of said housing, said stop block designed to mate with a receptacle in a corresponding mounting bracket so as to set the proper position thereof with respect to said housing.

9. The instrument enclosure of claim 1, wherein each mounting bracket includes a locking leg having a projecting portion designed to extend therefrom and engage a corresponding slot in said housing when said mounting bracket is attached thereto.

10. The instrument enclosure of claim 1, further comprising at least one threaded hole in said user interface module for receiving a like-threaded fastener that is passed through a corresponding hole in said panel wall during enclosure mounting so as to secure said user interface module to said panel wall.

11. The instrument enclosure of claim 1, further comprising a gasket for placement between said user interface module and said panel wall.

12. The instrument enclosure of claim 1, wherein said housing is of molded construction.

13. A modular instrument enclosure comprising:
    a substantially hollow housing for containing various electronic components of said instrument;
    a cover plate for attachment to a first, open face, of said housing;
    a DIN rail receiving groove passing through a second face of said housing that is opposite to said first face;
    at least one raised mounting rib located on the exterior of each of two opposing walls of said housing; and
    optionally, at least two panel mounting brackets, each mounting bracket adapted to engage and be retained by a corresponding one of said raised mounting ribs on said housing, each mounting bracket including at least one hole for receiving a threaded stud of an optional user interface module, and a plurality of like-threaded nuts for engaging said threaded studs;
    wherein, when DIN rail mounted, said DIN rail receiving groove is engaged with a DIN rail and said housing is secured thereto; and
    wherein, when panel mounted, said second face of said housing is placed into abutting contact with a first side of a panel wall, said user interface module is placed into abutting contact with an opposite side of said panel wall, said mounting brackets are affixed to said housing, said threaded studs of said user interface module pass through holes in said panel wall and through said holes in said mounting brackets, and said nuts are threaded onto said studs so as to draw said housing toward said user interface module and into a secure, retained position against said panel wall.

14. The modular instrument enclosure of claim 13, wherein said cover contains at least one opening to allow access to said electronic components of said instrument.

15. The modular instrument enclosure of claim 13, wherein said mounting ribs are integral to said housing.

16. The modular instrument enclosure of claim 13, wherein said mounting ribs are of interlocking design.

17. The modular instrument enclosure of claim 13, wherein, when DIN rail mounted, said housing is secured to said DIN rail by one or more integral lock tabs and a cooperating sliding DIN rail lock element.

18. The modular instrument enclosure of claim 13, further comprising a display associated with said cover, said display viewable by a user when said enclosure is mounted to a DIN rail.

19. The modular instrument enclosure of claim 13, wherein said optional mounting brackets include nut receiving cavities.

20. The modular instrument enclosure of claim 13, wherein said mounting ribs each include a stop block located near said second side of said housing, said stop block designed to mate with a receptacle in a corresponding optional mounting bracket so as to set the proper position thereof with respect to said housing.

21. The modular instrument enclosure of claim 13, wherein each optional mounting bracket includes a locking leg having a projecting portion designed to extend therefrom and engage a corresponding slot in said housing when said mounting bracket is attached thereto.

22. The modular instrument enclosure of claim 13, further comprising at least one threaded hole in said optional user interface module for receiving a like-threaded fastener that is passed through a corresponding hole in said panel wall during enclosure mounting so as to secure said user interface module to said panel wall.

23. The instrument enclosure of claim 13, further comprising a gasket for placement between said optional user interface module and said panel wall.

24. The modular instrument enclosure of claim 13, wherein said housing is of molded construction.

25. A modular instrument enclosure assembly comprising:
a substantially hollow housing for containing various electronic components of said instrument;
a cover plate for attachment to a first, open face, of said housing;
a DIN rail receiving groove passing through a second face of said housing that is opposite to said first face;
at least one raised mounting rib located on the exterior of each of two opposing walls of said housing; and
a kit including at least two panel mounting brackets, a user interface module and a plurality of nuts, each mounting bracket adapted to engage and be retained by a corresponding one of said raised mounting ribs on said housing, each mounting bracket including at least one hole for receiving a threaded stud of said user interface module, said nuts threaded so as to engage said studs;
wherein, said enclosure is adapted to be DIN rail mounted by engaging said DIN rail receiving groove with a DIN rail and securing said housing thereto using one or more integral lock tabs and a cooperating sliding DIN rail lock element; and
wherein, said enclosure is adapted to be panel mounted by using said kit, whereby said second face of said housing is placed into abutting contact with a first side of a panel wall, said user interface module is placed into abutting contact with an opposite side of said panel wall, said mounting brackets are affixed to said housing, said threaded studs of said user interface module pass through holes provided in said panel wall and through said holes in said mounting brackets, and said nuts are threaded onto said studs so as to draw said housing toward said user interface module and into a secure, retained position against said panel wall.

26. The modular instrument enclosure assembly of claim 25, wherein said cover contains at least one opening to allow access to said electronic components of said instrument.

27. The modular instrument enclosure assembly of claim 25, wherein said housing is of molded construction and said mounting ribs are integral to said housing and of interlocking design.

28. The modular instrument enclosure assembly of claim 25, wherein said mounting ribs each include a stop block located near said second side of said housing, said stop block designed to mate with a receptacle in a corresponding optional mounting bracket so as to set the proper position thereof with respect to said housing.

29. The modular instrument enclosure assembly of claim 25, wherein each optional mounting bracket includes a locking leg having a projecting portion designed to extend therefrom and engage a corresponding slot in said housing when said mounting bracket is attached thereto.

30. The modular instrument enclosure assembly of claim 25, further comprising at least one threaded hole in said user interface module for receiving a like-threaded fastener that is passed through a corresponding hole in said panel wall during enclosure mounting so as to secure said user interface module to said panel wall.

31. The modular instrument enclosure assembly of claim 25, further comprising a gasket for placement between said user interface module of said kit and said panel wall.

* * * * *